United States Patent Office 3,178,384

Patented Apr. 13, 1965

3,178,384

SEMI-CONDUCTIVE FABRIC COMPRISING AN ETHYLENE-VINYL ACETATE COPOLYMER, WAX AND CARBON BLACK

Harold L. Rice, Wilmington, Del., and Donald C. Sutherland, Fairville, Pa., assignors to E. I. du Pont de Nemours and Company, Wilmington, Del., a corporation of Delaware No Drawing. Filed Feb. 19, 1962, Ser. No. 174,243
6 Claims. (Cl. 260—28.5)

This invention relates to semi-conductive compositions, and more particularly, to semi-conductive compositions which are applicable by hot-melt coating techniques.

Power cables insulated with rubber or a plastic and rated at 2 kv. or above usually must have a coating or tape wrapping of semi-conductive material to prevent corona discharge. The coating or tape is applied directly to the conductor core and the insulation is applied over the top of the semi-conductive material. The semi-conductive material prevents the formation of corona in the event that air spaces or voids are present between the conductor and insulation. For 5 kv. cables and over, two semi-conductive applications are made, one on the conductor and one just under the outer layer of insulation. The conductivity requirements of the semi-conductive material are not too critical and a resistance of about 10,000 ohms or less is satisfactory.

Semi-conductive coatings are also used in high quality electronics, radio and high fidelity equipment where it is important to reduce noise level. Aircraft and missile wiring especially needs the protection of a semi-conductive coating because the level of corona initiation drops as atmospheric pressure decreases. For example, corona stress may begin at about 2 kv. in a typical 10-mil insulation at sea level, but at high altitudes or in outer space, the initiation level may be reached at 1 kv. or less.

The most common semi-conductive materials now used are fabric (cotton or glass) tapes impregnated with a conductive carbon black and a resinous binder. The previous binders have been applicable only from solution and accordingly a need has existed for a binder which can be applied conveniently and economically by a hot-melt coating technique.

A need has also existed for a semi-conductive composition which can be applied by hot-melt technique directly to the conductor and thus eliminate the use of the fabric tape. The ridges formed at the overlap areas when the tape is spirally wrapped around the conductor and the presence of loose fibers from the cloth used which may penetrate the insulation during processing and cause points of electrical weakness, are distinct disadvantages of the fabric tapes.

It is, therefore, an object of the present invention to provide new semi-conductive compositions. Another object is to provide a semi-conductive composition applicable by hot-melt coating techniques. A further objective is to provide a semi-conductive composition suitable for application to a cloth tape by hot-melt coating. A still further objective is to provide a semi-conductive composition suitable for application by hot-melt coating directly to the conductor.

These and other objects of the invention are attained by providing a semi-conductive composition comprising, on a weight basis, 25 to 60 parts of an ethylene/vinyl acetate copolymer, 75 to 40 parts of a petroleum wax, and 5 to 40 parts per hundred parts of combined ethylene/vinyl acetate copolymer and petroleum wax, of dispersed conductive carbon. At temperatures above about 300° F., this composition exists as a hot-melt and can be readily applied to various substrates by standard hot-melt coating techniques. At lower temperatures, e.g. about 175–250° F., the compositions of this invention can be applied by extrusion techniques.

The ethylene/vinyl acetate copolymers suitable for use in these compositions can be prepared by methods well known in the art. Thus, the procedures described in U.S. Patents 2,200,429 and 2,703,794 may be used. The vinyl acetate content of suitable copolymers may range from about 25 to 40% by weight. The range of copolymerized vinyl acetate content preferred for maximum compatibility and adequate flexibility is 27 to 33% by weight. The vinyl acetate content of the copolymers can be determined by infrared analysis or by saponification number determination. Ethylene/vinyl acetate copolymers with an inherent viscosity of 0.45–1.50 as determined with 0.25% of the copolymer in toluene at 30° C. are suitable and copolymers having an inherent viscosity of 0.6–1.2 are preferred. Compositions containing ethylene/vinyl acetate copolymers having inherent viscosities lower than 0.45 are deficient in strength properties. Copolymers of higher inherent viscosities than 1.5 are difficult to prepare under conditions that are practical commercially. The melt index of preferred copolymers, as determined by ASTM Procedure D–1238–57T, falls within the range of about 0.1 to 200 g./10 min.

The term "petroleum wax" as used herein refers to both paraffin and microcrystalline waxes. Paraffin wax is a mixture of solid hydrocarbons derived through the fractional distillation of petroleum. After purification, paraffin wax contains hydrocarbons that fall within the formula $C_{23}H_{48}$—$C_{29}H_{60}$. It is a colorless, hard and translucent material having a melting point of about 130–165° F. Microcrystalline wax is also obtained through petroleum distillation. It differs from paraffin wax in having branched hydrocarbons of higher molecular weights. It is considerably more plastic than paraffin wax and has a melting point of about 150–200° F.

The operable ranges of ethylene/vinyl acetate copolymer and petroleum wax are 25 to 60 parts of the copolymer and, correspondingly, 75 to 40 parts of the wax for 100 parts of the combined mixture. At levels of copolymer below 25 parts, the compositions do not have sufficient flexibility and above 60 parts, the compositions are too viscous for convenient hot-melt application. Preferred ranges for optimum flexibility and ease of application are 40 to 50 parts of the copolymer and 60 to 50 parts of the petroleum wax.

The conductive carbon employed in the present invention is a finely divided carbon well known in the art and is generally either an acetylene black or an oil furnace black. A minimum of 5 parts of conductive carbon per hundred parts of the ethylene/vinyl acetate copolymer-petroleum wax mixture (hereinafter abbreviated p.h.r.) is required to obtain adequate conductivity for utility as a semi-conductive composition. The maximum conductive carbon level is about 40 p.h.r. since at higher levels the compositions become too viscous for hot-melt application and are brittle at room temperature. A preferred conductive carbon level is 6 to 15 p.h.r. since this assures adequate conductivity, good viscosity characteristics, acceptable flexibility, and minimum cost.

The semi-conductive compositions of this invention can be prepared by milling the ingredients on a rubber mill. This method is especially useful with compositions containing the higher proportions of ethylene/vinyl acetate copolymer. The compositions may also be conveniently prepared by adding the ethylene/vinyl acetate copolymer and conductive carbon to molten petroleum wax with adequate agitation to ensure the production of a homogeneous blend of the wax and ethylene/vinyl acetate copolymer and the adequate dispersion of the conductive carbon. Complete dispersion of the conductive carbon in which each particle is separated is not desired since this leads to very high and unsatisfactory resistances. Conductivity of the conductive carbon and the semi-conductive property of the present copolymer-wax-carbon compositions apparently depend on contact between the individual carbon particles. Accordingly, care should be exercised, particularly at the lower carbon levels, to avoid too complete dispersion of the carbon. The addition of the conductive carbon after the ethylene/vinyl acetate and wax are homogeneously blended provides a technique to avoid too complete dispersion. The presence of the wax in the composition provides a safety factor against too complete dispersion since it lowers the viscosity of the ethylene/vinyl acetate copolymer and thus limits the amount of energy that can be put into the composition during the mixing operation. This results in less strenuous mixing and less efficient dispersion of the carbon, particularly when the blends are prepared on a rubber mill. But no matter how the composition is prepared, the degree of dispersion of the conduction carbon component therein should be such that the composition will be semi-conductive, that is, dispersion of the carbon will not be so complete as to render the compositions completely insulative.

The invention is further illustrated by the following examples in which all parts are on a weight basis.

EXAMPLES 1–10

The compositions shown in Table I were prepared by mixing the ingredients on a rubber mill. The compositions were then pressed into 75 mil slabs and the surface resistivities determined as follows: The measuring device consisted of two silver electrodes, ⅛" wide x 1½" long, mounted 1½" apart on an insulating board. The device was placed on the surface of the test specimen, and a 200 g. weight placed on the insulating board to assure uniform contact of the electrodes with the test specimen. The resistance between the electrodes was then measured with a volt-ohmmeter.

*Table I*

| Example | Ethylene/vinyl acetate copolymer | | Microcrystalline wax | Conductive carbon [2] | Surface resistivity (ohm/sq.) |
|---|---|---|---|---|---|
| | A [1] | B [1] | | | |
| 1 | 100 | | | 25 | Infinite |
| 2 | | 100 | | 25 | Infinite |
| 3 | 100 | | | 35 | 6,000 |
| 4 | | 100 | | 35 | 5,000 |
| 5 | 100 | | | 45 | 300 |
| 6 | | 100 | | 45 | 400 |
| 7 | 50 | | 50 | 50 | <100 |
| 8 | | 50 | 50 | 35 | 25–40 |
| 9 | 50 | | 50 | 25 | 35 |
| 10 | | 50 | 50 | 25 | 100–300 |

[1] Ethylene/vinyl acetate copolymers: Sample A, 33% vinyl acetate; melt index, 25 g./10 min. Sample B, 28% vinyl acetate; melt index, 15 g./10 min.

[2] Conductive carbon sold commercially by the Cabot Corporation as "Vulcan" XC–72.

These results indicate a significantly lower resistance for the compositions containing the microcrystalline wax. The differences between the compositions with and without microcrystalline wax at the 25 p.h.r. level of conductive carbon are particularly noteworthy. The infinite resistance obtained in Examples 1 and 2 is apparently due to too complete dispersion of the carbon because of the high viscosity of the ethylene/vinyl acetate copolymers. The presence of the wax in the compositions of this invention thus not only permits them to be applied by a hot-melt technique but also appears to make the carbon more effective for its intended purpose by lowering the viscosity and thereby minimizing the chances for too complete dispersion of the carbon.

The composition obtained in Example 7 had an acceptable level of surface resistivity but was brittle at room temperature. Example 8 at the 35 p.h.r. level of conductive carbon was flexible.

EXAMPLES 11–14

The compositions shown in Table II were prepared as melts in a sigma blade mixer at 250° F. and then coated on a glass cloth with a hot, trailing blade coater at a temperature of about 350° F. The glass cloth was typical of those used for semi-conductive tape applications. The surface resistivities were determined as before. The results indicated that the resistivities of the compositions in Examples 11–14 fall in a practical range.

*Table II*

| Example | Ethylene/vinyl acetate copolymer A [1] | Paraffin wax | Conductive carbon [2] |
|---|---|---|---|
| 11 | 50 | 50 | 15 |
| 12 | 50 | 50 | 25 |
| 13 | 40 | 60 | 12.5 |
| 14 | 40 | 60 | 15 |

Notes.—([1]), ([2]). See footnotes to Table I.

Films, 10±2 mils in thickness, were prepared from the compositions in Examples 12, 13, and 14 by pressing between sheets of uncoated cellophane at 250–275° F. The surface resistivities were then determined as before. The results are summarized below.

| Example: | Surface resistivity (ohms/sq.) |
|---|---|
| 12 | 80 |
| 13 | 900 |
| 14 | 600 |

The film from the composition in Example 13 was flexible at 0° F.

EXAMPLES 15–17

The compositions shown in Table III were prepared as melts in a sigma blade mixer at 250° F. with the mixing times as shown. Films, 10±2 mils in thickness, were prepared and the surface resistivities determined as before. The results, which are summarized in Table III, indicate that a level of 3 p.h.r. of conductive carbon is insufficient to provide adequate conductivity, that is, a resistance of 10,000 ohms or less. By plotting the data obtained in Examples 15—17, it is determined that the minimum level of conductive carbon for adequate conductivity is about 5 p.h.r. The results obtained in Examples 16–17 also indicate that the ethylene/vinyl acetate copolymer-wax-conductive carbon compositions can be mixed as hot melts for extended periods of time without loss of adequate conductivity due to too complete dispersion of the conductive carbon.

*TABLE III*

| Example | Ethylene/vinyl acetate copolymer A [1] | Paraffin wax | Conductive carbon [2] | Surface resistivity (ohm/sq.) | | |
|---|---|---|---|---|---|---|
| | | | | Mixing time | | |
| | | | | 15 minutes | 30 minutes | 60 minutes |
| 15 | 40 | 60 | 3 | 24,000 | 26,000 | 26,000 |
| 16 | 40 | 60 | 6 | 3,500 | 3,600 | 3,600 |
| 17 | 40 | 60 | 9 | | | 2,000 |

Notes.—([1]), ([2]). See footnotes to Table I.

Application of the present semi-conductive compositions, e.g. by conventional hot-melt or extrusion techniques, directly to electrical conductors followed by the application of an outer coating of a conventional electric insulating material such as polyethylene or polyvinyl chloride by extrusion methods, provides electrical conductor assemblies well protected against the occurrence of corona discharge. Such assemblies comprise an electrical conductor core and a covering thereon comprising a semi-conductive composition such as is illustrated in the foregoing examples. Comparable electrical conductor assemblies are produced by wrapping the electrical conductor with semi-conductive tapes such as are illustrated in Examples 11–14, followed by application of an outer coating of a conventional insulating material by extrusion methods. The assemblies in this latter case comprise a conductor core and a covering thereon comprising a fabric tape impregnated with the semi-conductive composition.

The properties of the semi-conductive compositions of this invention may be modified, if desired, by the addition of small amounts of known petroleum wax modifiers such as antioxidants. It is intended that the appended claims are to cover these and similar modifications which do not adversely affect the conductivity properties and the hot-melt application of the claimed compositions.

The embodiments of the invention in which an exclusive property or privilege is claimed are defined as follows:

1. A semi-conductive composition comprising, on a weight basis, 25 to 60 parts of an ethylene/vinyl acetate copolymer containing 25 to 40% of copolymerized vinyl acetate, 75 to 40 parts of a petroleum wax, and 5 to 40 parts per hundred parts of combined ethylene/vinyl acetate copolymer and petroleum wax, of dispersed conductive carbon black.

2. A hot-melt composition suitable for production of semi-conductive coatings comprising, on a weight basis, 25 to 60 parts of an ethylene/vinyl acetate copolymer containing 25 to 40% of copolymerized vinyl acetate, 75 to 40 parts of a petroleum wax, and 5 to 40 parts per hundred parts by weight of combined ethylene/vinyl acetate copolymer and petroleum wax, of dispersed conductive carbon black.

3. A semi-conductive composition comprising, on a weight basis, 40 to 50 parts of an ethylene/vinyl acetate copolymer containing 27 to 33% of copolymerized vinyl acetate, 60 to 50 parts of a petroleum wax, and 6 to 15 parts per hundred parts by weight of combined ethylene/vinyl acetate copolymer and petroleum wax, of dispersed conductive carbon black.

4. A semi-conductive fabric comprising a fabric impregnated with a composition comprising, on a weight basis, 25 to 60 parts of an ethylene/vinyl acetate copolymer containing 25 to 40% of copolymerized vinyl acetate, 75 to 40 parts of a petroleum wax and 5 to 40 parts per hundred parts of combined ethylene/vinyl acetate copolymer and petroleum wax, of dispersed conductive carbon black.

5. An electrical conductor assembly comprising an electrical conductor core and a covering thereon comprising a semi-conductive composition comprising, on a weight basis, 25 to 60 parts of an ethylene/vinyl acetate copolymer containing 25 to 40% of copolymerized vinyl acetate, 75 to 40 parts of a petroleum wax and 5 to 40 parts per hundred parts of combined ethylene/vinyl acetate copolymer and petroleum wax, of dispersed conductive carbon black.

6. An electrical conductor assembly according to claim 5 wherein said covering on the conductor core comprises a fabric tape impregnated with said semi-conductive composition.

References Cited by the Examiner

UNITED STATES PATENTS

| | | | |
|---|---|---|---|
| 2,275,558 | 3/42 | Rodgers | 260—28 |
| 2,388,169 | 10/45 | McAlevy | 260—28 |
| 3,048,553 | 8/62 | Moss | 260—28.5 |

OTHER REFERENCES

Page 687, 1959, Golding, Polymers and Resins, New Jersey, Nostrand Co., Inc., chapt. 12.

MORRIS LIEBMAN, *Primary Examiner.*